Nov. 28, 1967 R. S. NEASHAM 3,355,730
DUAL CURSOR PLOTTER
Filed March 31, 1965 2 Sheets-Sheet 1
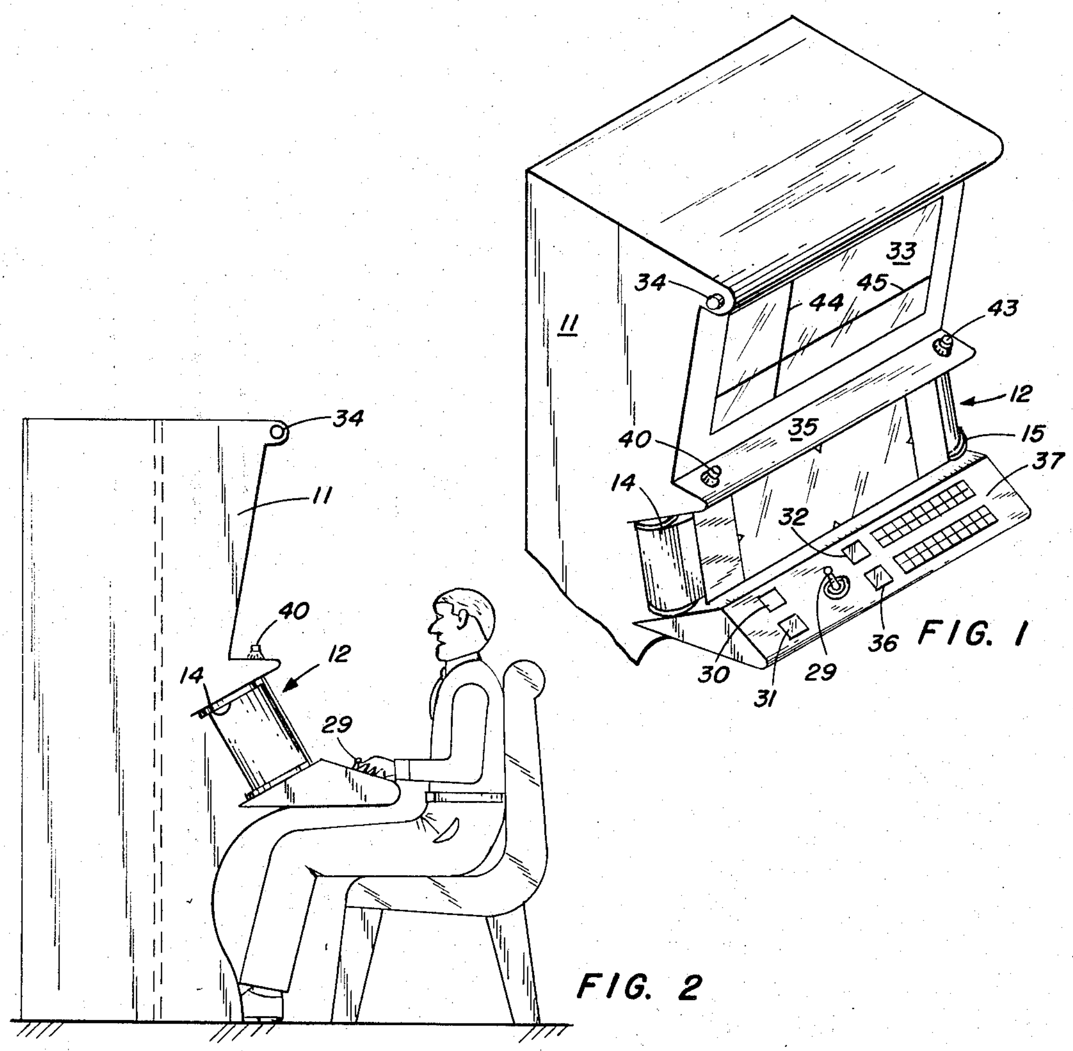
FIG. 1
FIG. 2
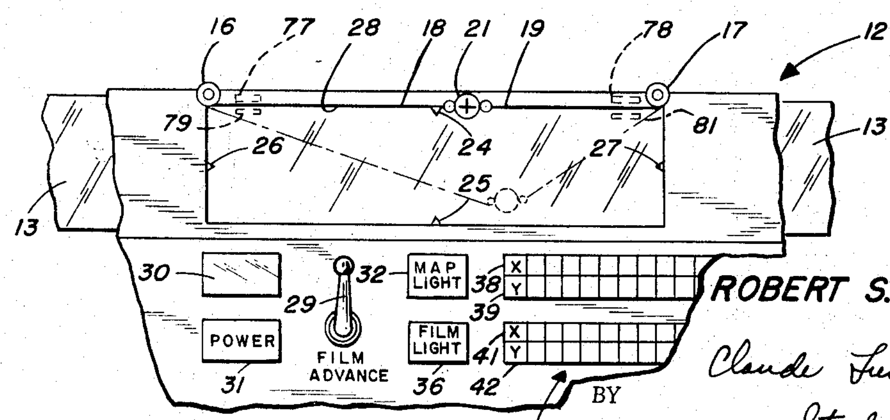
FIG. 3
INVENTOR
ROBERT S. NEASHAM
BY Claude Funkhouser
ATTORNEY
Stanley M. Garber
AGENT United States Patent Office 3,355,730

Patented Nov. 28, 1967

3,355,730

DUAL CURSOR PLOTTER

Robert S. Neasham, 1910 W. Surry Ave., Phoenix, Ariz. 85029

Filed Mar. 31, 1965, Ser. No. 444,474
1 Claim. (Cl. 340—286)

ABSTRACT OF THE DISCLOSURE

An apparatus for comparing known points on a map, located by X–Y coordinates, with similar points on a photograph of the area of the map where the photograph is taken from an elevation and at an angle.

The invention described herein may be manufactured and used by or for the Government of the United States of America for governmental purposes without the payment of any royalties thereon or therefor.

The instant invention visualizes the utilization of a coordinate dual cursor plotter to facilitate the cataloguing and storage of information in computer systems of the analog and digital type for the purpose of decreasing the time required to accomplish the mathematical operations associated therewith. It advantageously utilizes a coordinate measuring system for the purpose of reducing the pointings to analog or digital machine language numbers, thereby reducing the human operation to one of comparison and pointing. This function is accomplished by fixing the cross hairs or intersection of two wires of the apparatus, or other indicating mechanism as may be used therein, over commonly identifiable points on a photograph or map, and thereafter actuating an initiation circuit of the readout system. This input is for the purpose of feeding an electrical intelligence signal corresponding to the cross hair position into a storage and retrieval console. The input may be for punched or magnetic tape, or other storage facilities for computer utilization of a character and in a manner well known in the art. In general, the instrumentation of the instant invention utilizes a light table of a nature adapted to be located directly in front of the operator in an arrangement in which the film medium to be used for correlation purposes is disposed to run or be advanced from right to left, for example.

The light table is preferably of sufficient dimensions to portray a full format of the intelligence area captured on film by the camera and corresponding to that desired to be plotted. A suitable coordinate measuring instrument is disposed over the film medium with the respective stretched wires of the dual cursor device disposed along the X—X axis and the Y—Y axis, respectively, for providing a positive location of each point on the photo, which points are sequentially identified. The measuring instrument may be, and preferably is, provided with a magnifier or a suitable magnifier and cross hair viewer for providing a precise visual reading of the point of interest.

The principal purpose of the plotting is to obtain a comparison between the photo medium and a map of the area photographed to verify the extent of coverage by using common identification points on both the film medium and the map. These points consist primarily of cultural and geographic features which can be readily identified by the operator on the film and map at very small scales. Therefore, the magnification required is of a low power and is used primarily on the photo medium or picture. In the event there is a need for magnification on the map utilized with the film medium, projection techniques of a well-known character may be used in the map cabinet for such purposes. In such instances, the computer mechanism utilized therewith would be disposed in a unit separate from the map projection system.

Prior art systems have been for the most part directed to manual plotting of information desired from photographs directly or indirectly onto maps or the like as the storage media.

It is a feature of this invention to provide an improved system for correlation of points and areas presented by a photo medium which carries therein image intelligence, which correlation is compared with a map or reference giving geographic locations of known points or landmark indications of the terrain on a map or other intelligence carrying image whereby data storage and readout may be transferred to computer type mechanisms in a minimum period of time with a minimum expenditure of human effort directed to the overall process.

One object of the invention resides in the provision of an improved dual cursor plotter for purposes of rapid scanning and comparison of image intelligence carried in a photographic medium.

Another object resides in the provision of an improved dual cursor plotting mechanism for comparison of photographic image carried intelligence with a plan map or other intelligence medium of a greater scale and with differing orientation criteria for ultimate storage in computer type intelligence input and retrieval mechanisms.

Another object resides in the provision of an improved mechanism for correlating aerial photographic image media intelligence with plan maps representations presented before a viewing screen of an apparatus operated by an individual carrying out map verification and rectification operations prior to inteligence readout from the photo media intelligence.

Other objects, advantages and novel features of the invention will become apparent from the following detailed description of the invention when considered in conjunction with the accompanying drawings wherein:

FIG. 1 is a pictorial view of a console incorporating the improved dual cursor plotting mechanism of the instant invention;

FIG. 2 is a side elevation view of the console structure incorporating the dual cursor plotter of the instant invention;

FIG. 3 is a plan view of the instrument panel and film carriage mechanism of the dual cursor plotter of the instant invention;

Figure 4:
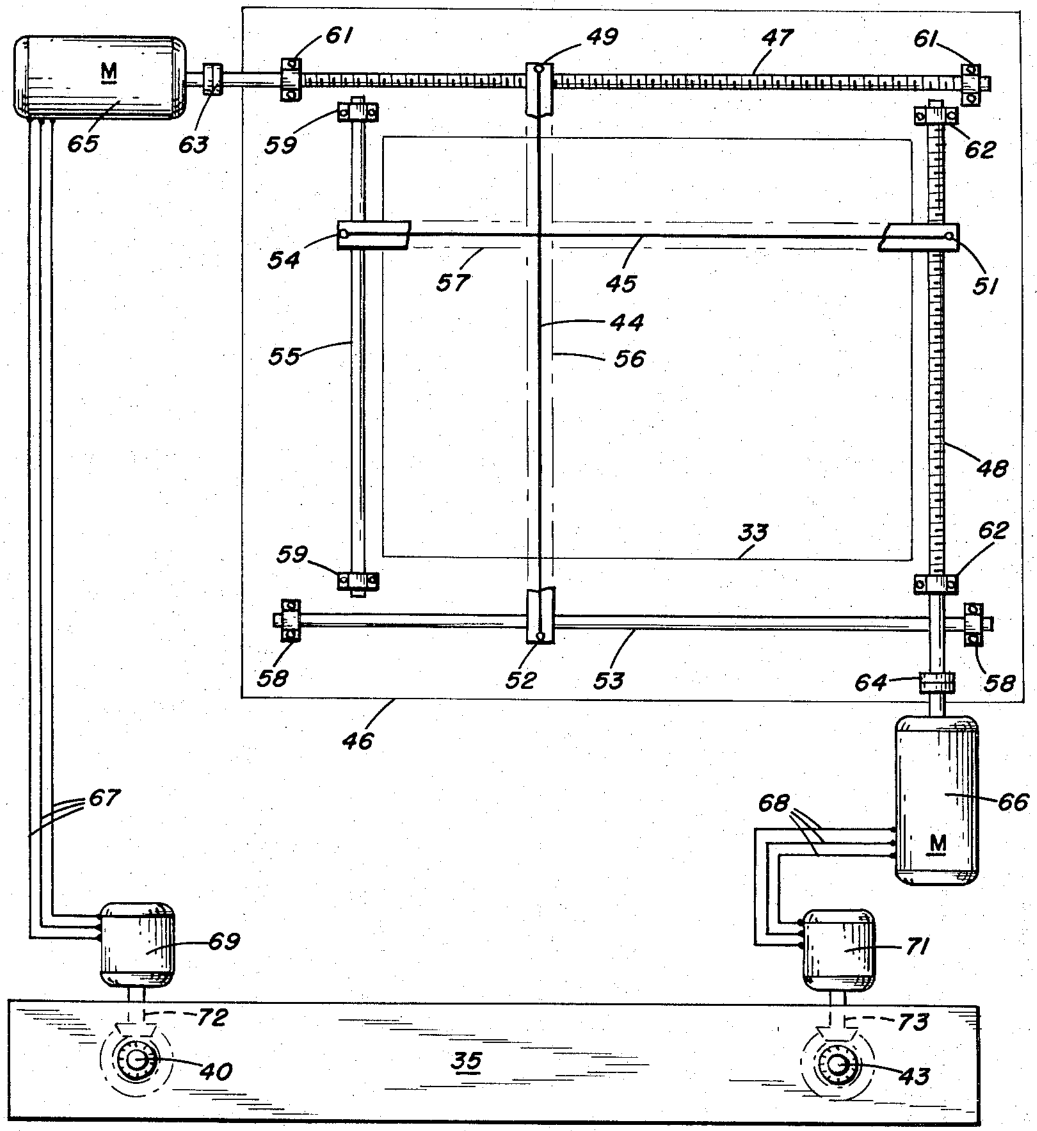
FIG. 4 is a diagrammatic plan view illustrating a drive arrangement for the cross wire indicating structure utilized with the map reference viewing system of the instant invention.

Referring now to the drawings, and more particularly to FIG. 1, the upper portion of a computer console of a character well adapted for utilization with the instant invention is generally indicated at 11. The instrument control panel of the dual cursor plotter is indicated generally at 12 and comprises a dual spool holding mechanism for advancing a film medium 13 between the spool 14 and the spool 15 thereof.

A pair of spring loaded Invar wire spools 16 and 17, as best shown in FIG. 3, are secured along the longitudinal edge of the control panel 12. A left-hand wire increment 18 and a right-hand wire increment 19, carried by spools 16 and 17, respectively, are connected at their ends to a cursor indicator 21 which may have magnification and cross-hair means of conventional construction therein. The shafts of each of the wire spools 16, 17 are connected to either a potentiometer or to a synchro, not shown, for providing an input to a computer connected thereto. A plurality of alignment indicies 24, 25, 26 and 27 are provided at a viewing station 28 on the panel 12 for orienting the film 13 passing therebeneath in a manner whereby a reference position signal derived therefrom may be correlated in the computer to establish an initial positional tie-in relationship with the map. The lower portion of the control panel 12 is provided with a dual position, center off, control 29 for advancing the film 13 in either a forward or a rearward direction by virtue of a motorized drive, not shown, which is connected in a manner to drive the film spools. When the control 29 is in a central position, as shown in FIG. 3, the film remains stationary. A main on-off power switch 31 is provided on the control panel 12 along with a map light switch 32 and a film light switch 36.

As best shown in FIGS. 1 and 2, for an illustrative embodiment of this portion of the apparatus, a map viewing station 33 having means for securing a map thereto, of a character such as, for example, is utilized with conventional vacuum easels, is provided with one or more lighting fixtures 34 which are controlled by the switch 32. The control panel 12 further includes a binary readout indicator, generally indicated by reference character 37, which may be utilized by the operator for reference purposes. The binary readout indicator 37 is comprised of a binary display for the map viewing station 33 having X—X and Y—Y coordinate binary displays 38 and 39, respectively, and a binary display for the film viewing station 28 having X—X and Y—Y coordinate binary displays 41 and 42, respectively.

The map viewing station 33 is provided with a generally horizontal deck 35 having a pair of control knobs 40 and 43 for controlling the position of the vertical and horizontal cross wires 44 and 45, respectively.

The aforedescribed map display represents the least complex arrangement for handling individual maps. If map information is to be handled and displayed in a manner requiring rapid and frequent changing of the map presentations, it is envisioned to utilize a rear projection screen mechanism of a character well known in the art and embodying structure such as is described in the U.S. Patent No. 2,660,920 of D. S. McChesney. Such an apparatus will facilitate the handling of individual map segments which are then enlarged by projection techniques to present the desired degree of magnification for the image appearing on the viewing screen thereof. In a modification of this nature, the cross lines may be superimposed upon the screen by utilizing one or a plurality of projected images from a separate projector or projectors disposed within the console. The lines may be carried by an opaque film medium having a transparent line thereon which is projected in a manner to maintain the desired linearity of movement thereof when the film carrying the line image to be projected is shuttled back and forth under control of a drive system, not shown, but connected for control by coordinate control knobs 40 and 43. A suitable projection system may incorporate one or more beam splitting prisms to facilitate the combining of all of the desired images prior to interception of the projected light beams at the screen viewing surface.

Referring now to FIG. 4, wherein a suitable control mechanism for use at the map viewing station is shown in detail, a frame or support member 46 is configured in a manner to permit the cross wires 44 and 45 to be disposed over the map surface after the map is positioned on the vacuum easel, or to be disposed immediately behind a transparent vacuum easel whereby the cross hairs may be illuminated by the illumination system including fixtures 34 for the purpose of producing line shadows in superposed relationship with the map. In such an arrangement the map would preferably be disposed on a light transmitting medium or film base.

The frame carries a pair of lead screws 47 and 48 which function upon rotation thereof to provide linear movement of the respective traveling nuts 49 and 51 associated therewith. The traveling nuts are mounted on suitably configured yoke elements 56 and 57 for controlled traverse of cross wires 44 and 45, respectively, and in an identifiable relationship with the plan map easel 33. The ends of the wires 44 and 45 which are remote from the traveling nuts 49 and 51 are affixed to guide block wire retainers 52 and 54 which in turn are mounted on the yoke elements 56 and 57, in a manner to be guided in the traversing movement thereof by guide rods 53 and 55, respectively. The ends of guide rods 53 and 55 are mounted in end support elements 58 and 59, respectively. The bearing elements 61 and 62 provide for rotation of the respective lead screws 47 and 48, yet prevent longitudinal movement thereof by virtue of shoulders, not shown, but disposed on the lead screws at a point immediately adjacent the bearings. The portion of the driven ends of the lead screws which project through one each, respectively, of the bearings 61 and 62 are connected through suitable couplings 63 and 64 to the respective synchro receivers or drive motors 65 and 66. Accordingly, a rotation of either of control knobs 40 or 43 on panel 35 will effect a linear displacement of the cross wires 44 or 45 since the knobs 40 and 43 are coupled by shafts 72 and 73, respectively, to a pair of synchro senders 69 and 71 which are electrically connected to the receivers 65 and 66 by wire means 67 and 68.

Figure 5:
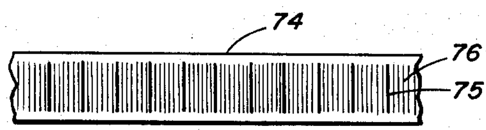
FIG. 5 is a plan view of a Farranti type grid as disposed on a Mylar tape which is utilized as an alternative to the Invar wires in accordance with a preferred embodiment of the instant invention.

It is within the purview of the present invention to utilize a Farranti type measuring system in place of the Invar wire system shown in FIG. 3. In this embodiment, a Mylar tape 74, as shown in FIG. 5, is provided with a plurality of photographically produced grid lines 75, 76, and is coiled on the spools 16, 17 in place of the Invar wires 18, 19. A pair of phototube or photomultiplier tube readout devices 77, 78, as shown in phantom in FIG. 3, are provided adjacent one side of the tape 74 with a pair of light sources 79, 81, being provided on the other side thereof for providing electrical pulses to the computer input in a well-known manner. If desired, a piece of the tape 74 with the grid lines 75, 76 thereon, may be positioned off-axis within each of the phototubes 77, 78 to increase the sensitivity and accuracy thereof in a conventional manner.

It is also within the purview of the inventive concept to utilize a ferric oxide type magnetically coated Mylar base film or tape having a clear area adjacent to indicator 21 for viewing therethrough, upon which prerecorded pulses of a desired frequency are provided adjacent suitable end portions. In this embodiment, not shown but considered to be obvious to those skilled in the art, magnetic playback heads would replace the phototubes 77, 78 whereby the pulses transduced by the magnetic playback head would be fed to a pulse counter prior to feed to the computer in a conventional manner.

In operation of the dual cursor plotter of the present invention, a map corresponding to the film to be plotted is secured to the easel 33 and the film 13 loaded on the spools 14, 15. The film 13 is then advanced by manipulating control 29 until the desired portion thereof is within the viewing station 28. When a commonly identifiable point on both the map and the film are discovered by the operator, the cross wires 44, 45 of the map viewing station 33 are positioned over that point on the map by manipulation of the control knobs 40 and 43. The cursor indicator 21 is then positioned over the same point on the film 13 and when this is accomplished, the computer read-in button 30 is pushed to thereby enter the X—X and Y—Y coordinates thereof into the computer. The X—X and Y—Y coordinates of the desired point on the film 13 are obtained in the present invention, as indicated above, by merely positioning the indicator 21 over the point. This is accomplished since a triangle having known sides is formed by the wire increments 18, 19 and the edge of the film within the viewing station 28. In other words, the wire increment 18, the wire increment 19 and the longitudinal edge of the film viewing station 28 form a triangle, the length of the sides of which are known. The X—X and Y—Y coordinates of the point can then be determined by the computer since the point lies at one of the vertexes of the known triangle.

Obviously many modifications and variations of the present invention are possible in the light of the above teachings. It is therefore to be understood that within the scope of the appended claims the invention may be practiced otherwise than as specifically described.

What is claimed is:

A dual cursor plotter for processing data obtained from photographically recorded image intelligence comprising the combination of a map of the area of the photographic intelligence, and means for producing in analog form the value of X and Y coordinates of any desired position on the map together with second means for obtaining, for correlation purposes an ordinal position on said photographic image intelligence, said second means comprising:

a rectangular framework of known linear extent for housing and framing that portion of the photographic intelligence corresponding to the area of the map;

spools carrying known lengths of wire mounted tangent to corners of said framework and at opposite inner ends of the upper linear edge of the framework, said linear edge indicating the length of the photographic intelligence corresponding to the area of the map; and a cursor indicator attached to the free ends of known lengths of wire so that when at rest the lengths of wire between the spools and the cursor will be equal and when positioned over a spot on the photographic intelligence, be measurable by the rotation of the spools;

whereby manual manipulation of the cursor above the photographic intelligence to a position corresponding to the position on the map being measured will provide a triangle of known sides, consisting in the linear length of the framework and the lengths of wire attached to the cursor and passing through the corners of the framework, to provide coordinates of a position on the photographic intelligence corresponding to the measured position on the map for purposes of comparison.

References Cited

UNITED STATES PATENTS

| | | | |
|---|---|---|---|
| 2,847,855 | 8/1958 | Berger | 88—14 |
| 3,254,560 | 6/1966 | Gottesmann | 88—24 |

FOREIGN PATENTS

| | | |
|---|---|---|
| 825,020 | 12/1951 | Germany. |

THOMAS A. ROBINSON, *Primary Examiner.*

NEIL C. READ, *Examiner.*

I. J. LEVIN, *Assistant Examiner.*